US010598948B2

(12) United States Patent
Yu et al.

(10) Patent No.: US 10,598,948 B2
(45) Date of Patent: Mar. 24, 2020

(54) DISPLAY DEVICE AND DISPLAY METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yangbing Yu, Beijing (CN); Qing Ma, Beijing (CN); Daekeun Yoon, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 61 days.

(21) Appl. No.: 15/542,309

(22) PCT Filed: Jan. 20, 2017

(86) PCT No.: PCT/CN2017/071931
§ 371 (c)(1),
(2) Date: Jul. 7, 2017

(87) PCT Pub. No.: WO2017/185841
PCT Pub. Date: Nov. 2, 2017

(65) Prior Publication Data
US 2018/0224662 A1 Aug. 9, 2018

(30) Foreign Application Priority Data
Apr. 25, 2016 (CN) ........................ 2016 1 0262702

(51) Int. Cl.
*G02B 27/22* (2018.01)

(52) U.S. Cl.
CPC .................................. *G02B 27/225* (2013.01)

(58) Field of Classification Search
CPC . G02B 27/225; G02B 27/2278; H04N 13/395
USPC ........................................ 345/418, 419, 619
See application file for complete search history.

(56) References Cited

U.S. PATENT DOCUMENTS 5,113,272 A * 5/1992 Reamey ............. G02B 27/2278 349/78
6,100,862 A * 8/2000 Sullivan .................. G06T 15/00 345/88

(Continued)

FOREIGN PATENT DOCUMENTS

CN 1875391 A 12/2006
CN 101064081 A 10/2007

(Continued)

OTHER PUBLICATIONS

Favalora, G. E., Napoli, J., Hall, D. M., Dorval, R. K., Giovinco, M., Richmond, M. J., & Chun, W. S. (Aug. 2002). 100-million-voxel volumetric display. In Cockpit Displays IX: Displays for Defense Applications (vol. 4712, pp. 300-313). International Society for Optics and Photonics.*

(Continued)

*Primary Examiner* — Sarah Lhymn
(74) *Attorney, Agent, or Firm* — Ladas & Parry LLP; Hermine Valizadeh

(57) ABSTRACT

A display device and a display method are provided. The display device includes a plurality of transparent display units configured to emit imaging light along a same direction and arranged in sequence with spaces therebetween along a light-emitting direction of the imaging light; and a layer-by-layer scan circuit configured to respectively input a plurality of depth images of a same three-dimensional (3D) image into corresponding transparent display units in the plurality of transparent display units, wherein, the plurality of depth images have different depth ranges; and upon each transparent display unit displaying the inputted depth image, the layer-by-layer scan circuit is configured to control transparent display units on a display side of the each transparent display unit to be in a transparent state.

16 Claims, 3 Drawing Sheets

(56) References Cited

U.S. PATENT DOCUMENTS

| | | | | |
|---|---|---|---|---|
| 8,608,319 | B2 | 12/2013 | Griswold et al. | |
| 9,106,909 | B2 | 8/2015 | Santori et al. | |
| 2006/0273983 | A1 | 12/2006 | Koo et al. | |
| 2007/0024822 | A1 | 2/2007 | Cortenraad et al. | |
| 2011/0175902 | A1* | 7/2011 | Mahowald | H04N 13/395 345/419 |
| 2011/0317878 | A1* | 12/2011 | Kang | G01S 17/89 382/106 |
| 2012/0270649 | A1 | 10/2012 | Griswold et al. | |
| 2012/0320049 | A1* | 12/2012 | Kim | H04N 13/395 345/419 |
| 2012/0320291 | A1 | 12/2012 | Yang et al. | |
| 2014/0132724 | A1 | 5/2014 | Choi et al. | |
| 2014/0192173 | A1 | 7/2014 | Yu et al. | |
| 2015/0177528 | A1 | 6/2015 | Park et al. | |
| 2017/0261746 | A1* | 9/2017 | Tam | G02B 27/0101 |

FOREIGN PATENT DOCUMENTS

| | | | | | |
|---|---|---|---|---|---|
| CN | 101511036 | A | | 8/2009 | |
| CN | 102457756 | A | | 5/2012 | |
| CN | 102469316 | A | | 5/2012 | |
| CN | 102654697 | A | | 9/2012 | |
| CN | 102681239 | A | | 9/2012 | |
| CN | 103809228 | A | | 5/2014 | |
| CN | 104581110 | A | | 4/2015 | |
| CN | 104980728 | A | | 10/2015 | |
| CN | 204761617 | U | | 11/2015 | |
| CN | 105872520 | A | * | 8/2016 | G02B 27/2278 |
| CN | 105872520 | A | | 8/2016 | |

OTHER PUBLICATIONS

ISR and Written Opinion dated Apr. 5 2017; PCT/CN2017/071931.

The First Office Action dated Jun. 9, 2017; Appln. No. 201610262702.6.

The Third Chinese Office Action dated May 22, 2018; Appln. No. 201610262702.6.

The Second Chinese Office Action dated Nov. 7, 2017; Appln. No. 201610262702.6.

Extended European Search. Report dated Jan. 15, 2020; Appln. No. 17788501.9.

* cited by examiner

DISPLAY DEVICE AND DISPLAY METHOD

TECHNICAL FIELD

Embodiments of the present disclosure relate to a display device and a display method.

BACKGROUND

Three-dimensional (3D) technology is a research hotspot in the technical field of display. The most basic principle of 3D display is to allow two eyes of a viewer to view different images which are subsequently synthesized into a 3D image in the brain of the viewer.

The current commonly used 3D display technology is stereo image pair technology, namely light emitted by a display is split towards two directions by a parallax barrier and respectively enters the left eye and the right eye of the viewer, and hence produces binocular parallax. But this 3D display mode has a large loss of light, so the display has large power consumption in the case of 3D display.

SUMMARY

Embodiments of the present disclosure provide a display device and a display method, which are used for reducing the power consumption of the display device.

At least one embodiment of the present disclosure provides a display device, comprising: a plurality of transparent display units configured to emit imaging light along a same direction and arranged in sequence with spaces therebetween along a light-emitting direction of the imaging light; and a layer-by-layer scan circuit configured to respectively input a plurality of depth images of a same three-dimensional (3D) image into corresponding transparent display units in the plurality of transparent display units, wherein, the plurality of depth images have different depth ranges; and upon each transparent display unit displaying the inputted depth image, the layer-by-layer scan circuit is configured to control transparent display units on a display side of the each transparent display unit to be in a transparent state.

For example, the display device further comprises a signal source configured to provide the plurality of depth images.

For example, as a maximum depth of the plurality of depth images is sequentially increased, a distance from the transparent display units respectively corresponding to the plurality of depth images to a display surface of the display device is sequentially increased.

For example, a number of the plurality of depth images is equal to a number of the plurality of transparent display units.

For example, the signal source includes a depth processing device configured to process the 3D image to acquire the plurality of depth images.

For example, the depth processing device includes a processor, a memory and computer program instructions stored into the memory; and the computer program instructions are run by the processor so as to execute the following action: dividing at least partial depth range of the 3D image into the different depth ranges so as to acquire the plurality of depth images.

For example, display regions of the plurality of transparent display units have a same size.

For example, a distance between adjacent transparent display units is not greater than a ratio of a maximum size of the display region to a number of the transparent display units.

For example, distances between adjacent transparent display units in the plurality of transparent display units are equal.

For example, the plurality of transparent display units are all transparent organic light-emitting diode (OLED) display units or transparent polymer light-emitting diode (PLED) display units.

For example, the signal source includes a 3D image acquisition device which is configured to acquire light intensity of objects in a target scene and a distance from the objects to the 3D image acquisition device.

For example, the 3D image acquisition device includes a planar image acquisition device and a depth information measuring device.

For example, the display device is a vehicle display device.

At least one embodiment of the present disclosure provides a display method, comprising: respectively inputting a plurality of depth images based on a same 3D image into a plurality of transparent display units, wherein the plurality of depth images have different depth ranges, and the plurality of transparent display units emit imaging light along a same direction and are arranged in sequence with spaces therebetween along the same direction; and controlling the plurality of transparent display units to sequentially display the inputted depth image, and controlling transparent display units on a display side of each transparent display unit to be in a transparent state upon the each transparent display unit displaying the inputted depth image.

For example, at least partial depth range of the 3D image is divided into different depth ranges to acquire the plurality of depth images.

For example, a number of the plurality of depth images is equal to a number of the plurality of transparent display units.

For example, the plurality of transparent display units are sequentially arranged along a direction opposite to a propagation direction of the imaging light and are configured to display the respective depth images with gradually increased maximum depths.

For example, the plurality of transparent display units have a serial number of 1, 2, . . . , n in sequence along the direction opposite to the propagation direction of the imaging light; distances from the transparent display units 2, . . . , n to the transparent display unit 1 is respectively d21, . . . , dn1; the 3D image is divided into the plurality of depth images through a plurality of thresholds; and the plurality of thresholds are respectively k·d21, . . . , k·dn1, in which k is a coefficient greater than 0.

For example, a refresh rate of each transparent display unit is greater than or equal to 24 frames per second.

The embodiment of the present disclosure can convert different depths of objects in a plurality of depth images of the same 3D image (namely different distances from the objects in the depth images to a camera in the shooting process) into different distances between a plurality of transparent display units and the viewer, and hence can achieve 3D display with real stereo display effect. Compared with the technology of achieving 3D display by adoption of stereo image pairs, as the parallax barrier is not required to be used in the embodiment of the present disclosure, the embodiment of the present disclosure can reduce the power consumption of 3D display.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise specified, the technical terms or scientific terms used in the present disclosure have normal meanings understood by those skilled in the art. The words "first", "second" and the like used in the disclosure do not indicate the sequence, the number or the importance but are only used for distinguishing different components. The word "comprise", "include" or the like only indicates that an element or a component before the word contains elements or components listed after the word and equivalents thereof, not excluding other elements or components. The words "connection", "connected" and the like are not limited to physical or mechanical connection but may include electrical connection, either directly or indirectly. The words "on", "beneath", "left", "right" and the like only indicate the relative position relationship which is correspondingly changed when the absolute position of a described object is changed.

Embodiments of the present disclosure provide a display device and a display method. In the embodiment of the present disclosure, an 3D image is divided into a plurality of depth images with different depth ranges (for instance, 3 or more than 3 depth images); the depth images are respectively input into a plurality of transparent display units through a layer-by-layer scan circuit; and when an object in the depth image is closer to a camera in the shooting process, the transparent display unit for displaying the depth image provided with the object is closer to the viewer in the case of 3D display. In addition, in the case of 3D display, the layer-by-layer scan circuit also controls the transparent display units to display corresponding depth images one by one. This mode can convert different depths of objects in the plurality of depth images based on the same 3D image into different distances between the plurality of transparent display units and the viewer, and hence can achieve 3D display with real stereo display effect. Compared with the technology of achieving 3D display by adoption of stereo image pairs, as the parallax barrier is not required to be used in the embodiment of the present disclosure, the embodiment of the present disclosure can reduce the power consumption of 3D display.

Description will be given below to the overall proposal of the display device provided by the embodiment of the present disclosure with reference to FIGS. 1 to 4.

Figure 1:
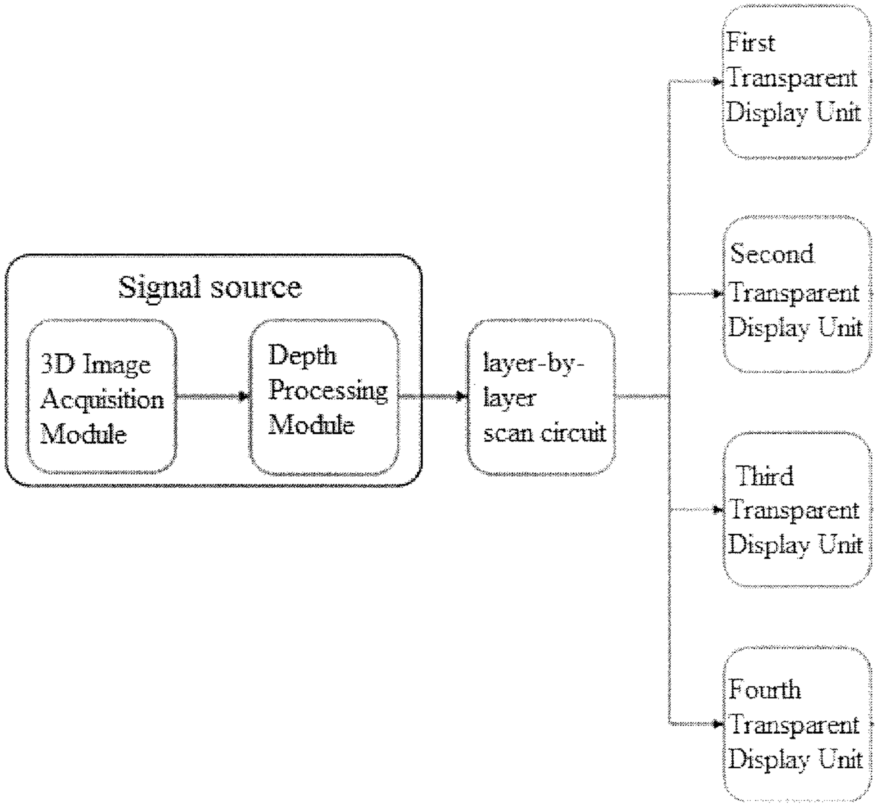
FIG. 1 is a structural block diagram of a display device provided by the embodiment of the present disclosure.

As illustrated in FIG. 1, at least one embodiment of the present disclosure provides a display device, which comprises a signal source, a layer-by-layer scan circuit and a plurality of transparent display units. FIG. 1 only schematically illustrates first, second, third and fourth transparent display units. Of course, the number of the transparent display units may also be 3 or be greater than or equal to 5.

The signals source in the display device provided by the embodiment of the present disclosure is configured to provide a plurality of depth images (for instance, 3, 4 or more depth images) based on the same 3D image, and the plurality of depth images have different depth ranges. For instance, the different depth ranges of the plurality of depth images may be not overlapped. The 3D image has planar image information and depth information of various positions in a planar image (namely the distance from space objects corresponding to the positions to the camera in the shooting process).

Figure 2:
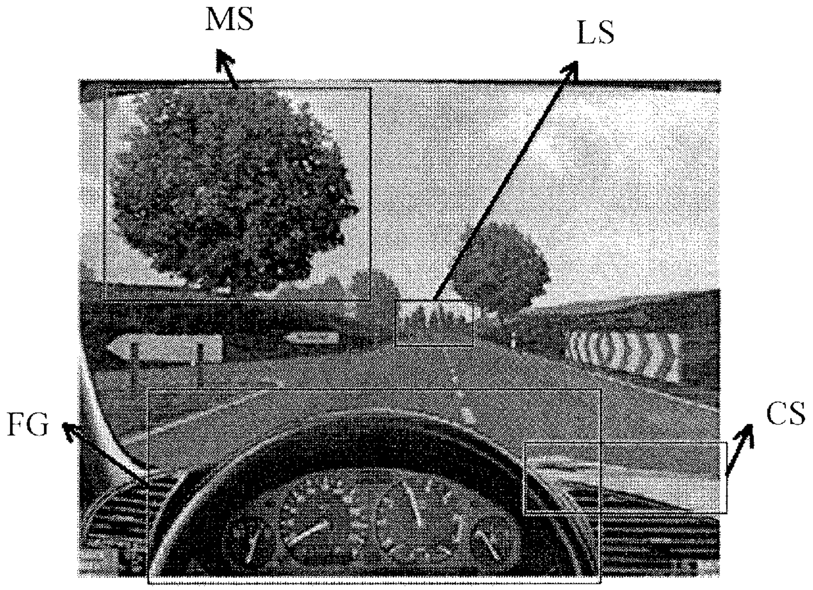
FIG. 2 is a schematic diagram illustrating the division of a 3D image provided by a signal source into a plurality of depth images in the display device provided by the embodiment of the present disclosure.

For instance, as for a 3D image acquired by a pick-up device on a vehicle as illustrated in FIG. 2, objects in the 3D image may be divided into foreground (FG), close shot (CS), medium shot (MS) and long shot (LS) according to the distance to the pick-up device in the shooting process from small to large. For instance, the FG may include objects such as a steering wheel, a pedal and instruments of the vehicle. For instance, the CS may include objects such as a car body and a rear-view mirror. For instance, the MS may include objects such as the road and roadside trees on front of the vehicle. For instance, the LS may include objects such as faraway buildings. Correspondingly, the 3D image as illustrated in FIG. 2 may be divided into depth images with different depth ranges, namely an FG image, a CS image, an MS image and an LS image. The division mode as illustrated in FIG. 2 is only used for illustrative description. The embodiment of the present disclosure includes but not limited to the mode as illustrated in FIG. 2.

Figure 3:
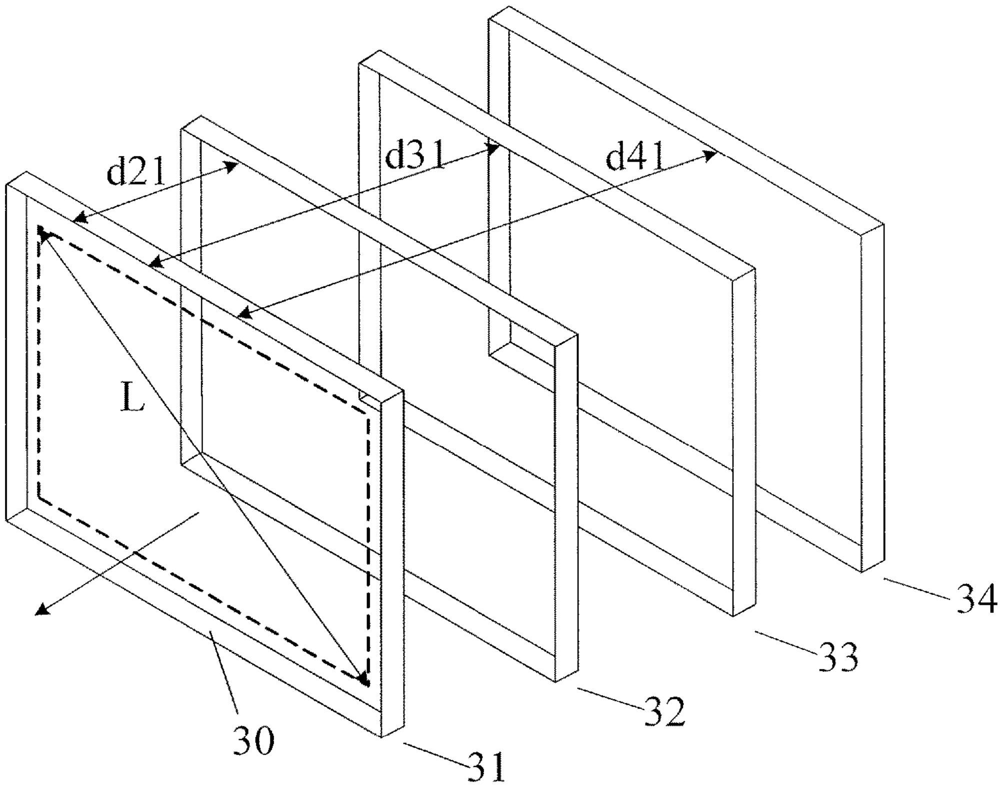
FIG. 3 is a schematic diagram of a plurality of transparent display units in the display device provided by the embodiment of the present disclosure.

The plurality of transparent display units in the display device provided by the embodiments of the present disclosure are configured to emit imaging light along the same direction (namely the imaging light emitted by the plurality of transparent display units have same propagation direction), and the plurality of transparent display units are spaced from each other in sequence along the same direction. It should be noted that the spaced arrangement of the plurality of transparent display units here indicates that there are gaps between imaging planes of the display units, not excluding the case that the plurality of transparent display units make contact with each other and are superimposed. Of course, in order to obtain better 3D experience, there may be certain distance between the plurality of transparent display units. Taking four transparent display units as an example, for instance, as illustrated in FIG. 3, a first transparent display unit 31, a second transparent display unit 32, a third transparent display unit 33 and a fourth transparent display unit 34 emit imaging light along the same direction (as illustrated by arrowheads in FIG. 3) and are arranged in sequence with spaces therebetween along a direction opposite to the propagation direction of the imaging light, so that the distance from the first, second, third and fourth transparent display units 31-34 to a display surface 30 (a surface on a display side) of the display device can be gradually increased. Description is given in FIG. 3 by taking the case that a display surface of the first transparent display unit 31 is taken as the display surface of the display device as an example. The display surface here is only taken as a reference surface to show different distances between different transparent display units and the display surface, so the setting of the display surface is not limited to the above specific means. For instance, the display surface of the display device may also be disposed in front of the display surface of the first transparent display unit.

The layer-by-layer scan circuit in the display device provided by the embodiment of the present disclosure is configured to respectively input the plurality of depth images provided by the signal source into the plurality of transparent display units. Moreover, when each transparent display unit displays the inputted depth image, the layer-by-layer scan circuit is configured to control transparent display units on a display side of the transparent display unit to be in transparent state. For instance, when each transparent display unit displays the inputted depth image, the layer-by-layer scan circuit is configured to control the remaining transparent display units to be in transparent state. For instance, the layer-by-layer scan circuit may allocate the depth images to the transparent display units by the following methods: with the sequential increase of the maximum depth of the plurality of depth images, the distance from the transparent display units, respectively corresponding to the plurality of depth images, to the display surface of the display device is sequentially increased. It should be noted that the maximum depth of the depth image refers to an upper limit of the depth range of the depth image.

Figure 4:
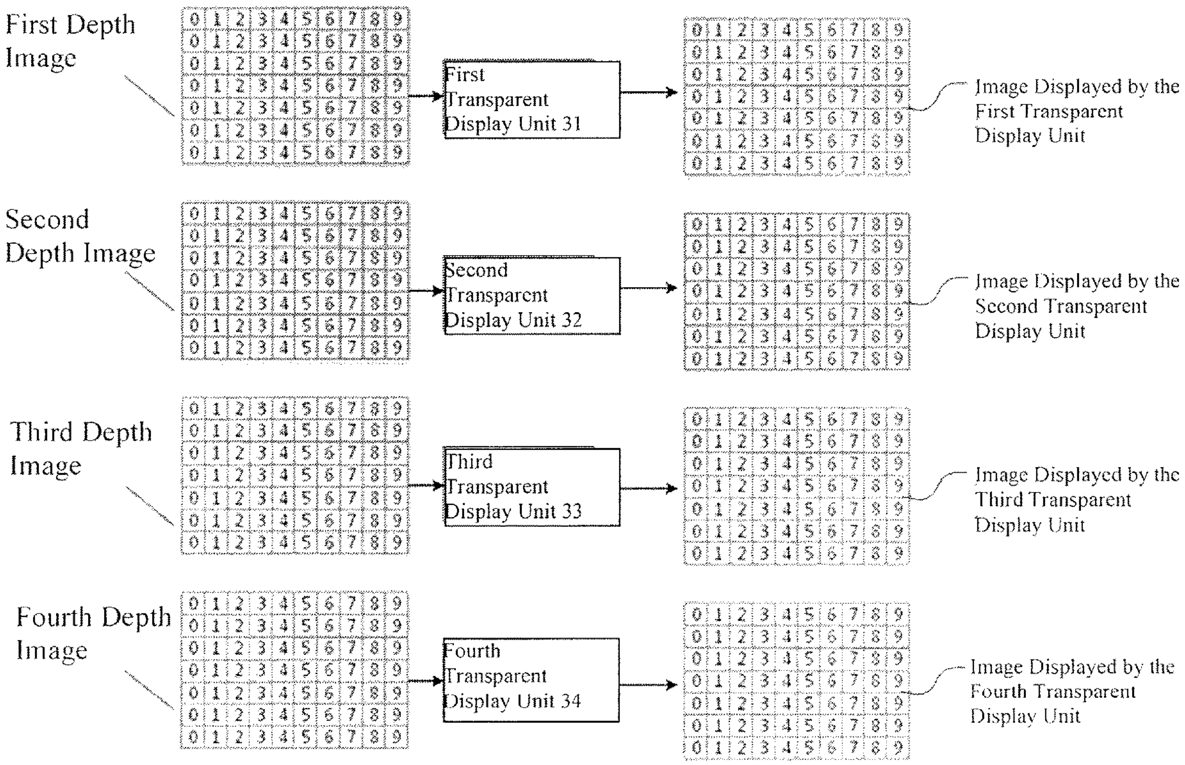
FIG. 4 is a schematic diagram of depth images respectively inputted into and images respectively displayed by the plurality of transparent display units in the display device provided by the embodiment of the present disclosure.

Taking four depth images and four transparent display units as illustrated in FIG. 3 as an example, supposing that the four depth images are respectively a first depth image, a second depth image, a third depth image and a fourth depth image, the maximum depth of objects in the first, second, third and fourth depth images (namely the maximum distance from the objects in the depth images to the camera in the shooting process) is gradually increased. When the distance from first, second, third and fourth transparent display units 31 as illustrated in FIG. 3 to a display surface 30 of the display device is gradually increased, as illustrated in FIG. 4, a layer-by-layer scan circuit (not illustrated in FIG. 4) may input the first depth image (e.g., an FG image) into the first transparent display unit 31, input the second depth image (e.g., a CS image) into the second transparent display unit 32, input the third depth image (e.g., an MS image) into the third transparent display unit 33, and input the fourth depth image (e.g., an LS image) into the fourth transparent display unit 34. In the case of 3D display, the layer-by-layer scan circuit controls the first transparent display unit 31 to display the first depth image (in the process, for instance, may also control the remaining transparent display units to be in transparent state); after the first transparent display unit 31 displays the first depth image completely, the layer-by-layer scan circuit controls the second transparent display unit 32 to display the second depth image and at least controls the first transparent display unit 31 to be in transparent state, for instance, controls the remaining transparent display units to be in transparent state; and so on until the fourth transparent display unit displays the fourth depth image completely.

In the embodiment of the present disclosure, as the mode of layer-by-layer scan of the plurality of transparent display units is adopted, any transparent display unit will not be affected by images displayed by other transparent display units in the process of image display, so that each transparent display unit can display all the pixels in the depth image inputted into the transparent display unit. For instance, as illustrated in FIG. 4, one pixel in each depth image is represented by one number in 0-9, and pixels of the image displayed by each transparent display unit are consistent with pixels in the depth image inputted into the transparent display unit. Therefore, by adoption of layer-by-layer scan, the display device provided by the embodiment of the present disclosure can have high resolution. It should be noted that the depth images in FIG. 4 are only illustrative and do not represent true images.

Taking the division mode of the 3D image as illustrated in FIG. 2 and the plurality of transparent display units as illustrated in FIG. 3 as an example, when the first, second, third and fourth transparent display units respectively display the FG image, the CS image, the MS image and the LS image, when the viewer views from a display side (a side of the first transparent display unit 31 away from the second transparent display unit 32 as illustrated in FIG. 3) of the display device provided by the embodiment of the present disclosure, the plurality of transparent display units in the display device display the depth images inputted into the transparent display units one by one under the control of the layer-by-layer scan circuit. As the first, second, third and fourth transparent display units 31-34 are arranged according to the distance to the viewer from small to large, and the distance from the objects in the depth images displayed by the transparent display units to the camera in the process of shooting is also increased, the space distance from the objects in the 3D image as illustrated in FIG. 2 to the camera in the shooting process is converted into the distance from corresponding transparent display unit to the viewer in the case of 3D display. By utilization of the persistence of vision of the human eyes, when the display frequency of each transparent display unit is not less than 24 Hz (namely the refresh rate of the transparent display unit is not less than 24 frames per second), the images displayed by the transparent display units can form continuous images in the brain of the viewer, so as to form a 3D image with true dimension.

When the display device provided by the embodiment of the present disclosure comprises transparent display units of other numbers, the principle of achieving 3D display is also similar to the above principle. Moreover, when the number of the transparent display units is increased, the transition of depth images displayed by adjacent transparent display units is smoother, so the 3D display effect can be better.

Detailed description will be given below to the signal source, the transparent display units and the layer-by-layer scan circuit in the display device provided by the embodiment of the present disclosure.

Figure 5:
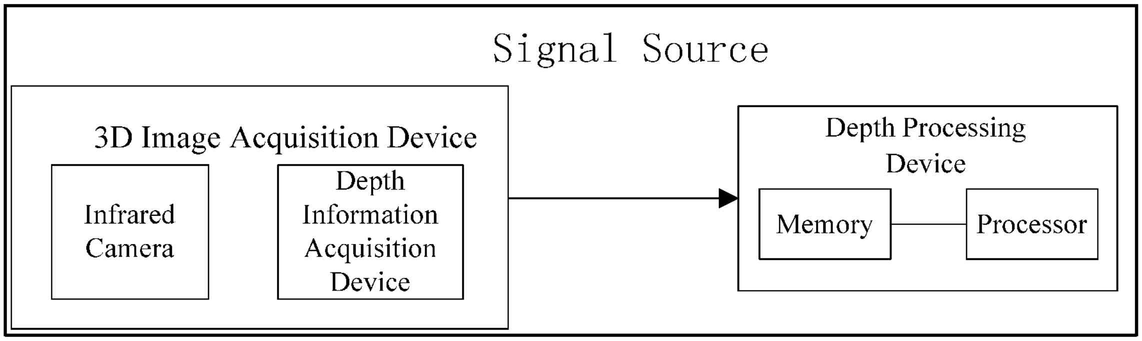
FIG. 5 is a structural block diagram of a signal source provided by the embodiment of the present disclosure.

For instance, as illustrated in FIG. 5, the signal source includes a depth processing device which is configured to process the 3D image to acquire the plurality of depth images. For instance, the depth processing device may include a processor, a memory and computer program instructions stored in the memory. The computer program instructions are run by the processor to execute the following action: dividing at least partial depth range of the 3D image into different depth ranges to acquire the plurality of depth images. For instance, the depth processing device may be implemented by an integrated circuit (IC).

For instance, the at least partial depth range of the 3D image may be divided to acquire the plurality of depth images according to the number of the plurality of transparent display units in the display device and the distance between the transparent display units.

For instance, the number of the plurality of depth images divided from the 3D image may be equal to the number of the plurality of transparent display units in the display device.

Description will be given below to the division of the at least partial depth range of the 3D image according to the distance between the transparent display units by example.

For instance, when the display device comprises 4 transparent display units, the 3D image may be divided into first, second, third and fourth depth images. For instance, the initial depth range of the first, second, third and fourth depth images may be set to be less than A, A~B, B~C and greater than C in sequence, in which A<B<C. That is to say, the depth of positions in the first depth image (namely the distance from space objects corresponding to the positions to the camera in the shooting process) may be less than A; the depth of positions in the second depth image may be greater than A and less than B; the depth of positions in the third image may be greater than B and less than C; the depth of positions in the fourth depth image may be greater than C (in this case, the maximum depth of the fourth depth image may be considered infinitely great); and the position at which the depth is A, B, or C may be any one in corresponding adjacent depth images.

For instance, as illustrated in FIG. 3, the distance from the first, second, third and fourth transparent display units 31-34 to the display surface 30 of the display device is sequentially increased, and the distance from the second, third and fourth transparent display units 32-34 to the first transparent display unit 31 (the distance between display surfaces) is d21, d31 and d41 in sequence. The first, second, third and fourth transparent display units 31-34 may be set to respectively display the first, second, third and fourth depth images. In this case, A=k·d21, B=k·d31, and C=k·d41 may be set, in which k is a coefficient greater than 0, for instance, k=1, 1.5, 2, 5, 10 or any other value greater than 0.

Taking d21=100 mm, d31=200 mm and d41=300 mm (namely the distance between adjacent transparent display units is 100 mm) and k=1 as an example, A=100 mm, B=200 mm, C=300 mm. That is to say, the first transparent display unit may display objects with the actual depth of <100 mm in the 3D image; the second transparent display unit may display objects with the actual depth of 100~200 mm in the 3D image; the third transparent display unit may display objects with the actual depth of 200~300 mm in the 3D image; and the fourth transparent display unit may display objects with the actual depth of >300 mm in the 3D image.

It should be noted that the above settings of the initial depth ranges of the depth images are only illustrative, and different depth ranges of the plurality of depth images based on the same 3D image may also be set by other means according to actual demands, so that the display device provided by the embodiment of the present disclosure can acquire a smoother and more vivid 3D image. On the other hand, the initial depth ranges of the depth images may also be scaled by adjustment of k value, so that the overall scaling of the 3D image can be achieved, until the required 3D display effect is obtained.

As different depth ranges of the depth images may be adjusted according to the distance between the transparent display units, in order to simplify the adjustment of depth range, for instance, the distances between adjacent transparent display units in the plurality of transparent display units in the display device provided by at least one embodiment of the present disclosure may be equal. For instance, the distance between the adjacent transparent display units (namely the distance between display surfaces of the adjacent transparent display units) may be not greater than the ratio of the maximum size of a display region (for instance, as illustrated by a dotted line frame in FIG. 3) of the transparent display unit (for instance, as for a rectangular display region, the maximum size thereof is the diagonal size L of the display region) to the number of the transparent display units, so as to avoid the case that the 3D image cannot be synthesized in the brain of the viewer due to too large spacing. For instance, when the diagonal size of the display region is 32 inches, the distance between the adjacent transparent display units may be not greater than 8 inches.

In order to ensure smoother transition between the images displayed by the adjacent transparent display units, for instance, the display regions of the plurality of transparent display units in the display device provided by at least one embodiment of the present disclosure may have the same size.

Of course, the distance between the plurality of transparent display units and the setting of the size of the display regions, in the embodiment of the present disclosure, include but not limited to the above examples.

For instance, the signal source may further include a 3D image acquisition device which is configured to acquire the light intensity of objects in a target scene (planar images of the objects in the target scene may be acquired according to the light intensity) and the distance from the objects to the 3D image acquisition device (namely acquiring depth information of the objects in the planar images, that is, the distance from the objects to the camera in the shooting process), so that the 3D image can be acquired.

For instance, the 3D image acquisition device includes a planar image acquisition device (mainly used for acquiring the planar images of the objects in the target scene) and a depth information measuring device (mainly used for acquiring the depth information of the objects in the target scene). For instance, the planar image acquisition device may include an image acquisition device such as a color camera or a black and white camera. For instance, the depth information measuring device may be a distance measuring unit such as a radar detector or an ultrasonic distance sensor. For instance, both the planar image acquisition unit and the depth information measuring unit may include an infrared camera which may be configured to acquire planar images and depth information of an infrared emitter (e.g., the human body or the animal). More full depth information of the objects can be acquired through the depth information measuring unit, so that the 3D image can be divided into more depth images, and hence the stereo display effect can be improved.

For instance, the signal source may include a planar image acquisition device such as a color camera or a black and white camera, an infrared camera and a distance measuring device (e.g., a radar detector). For instance, the planar image acquisition device is adopted to acquire image data of objects in a scene (for instance, images of background objects); the infrared camera is adopted to acquire infrared depth data of an infrared emitter (e.g., the human body); and the distance measuring device is adopted to help acquiring depth data (for instance, depth data of a non-infrared emitter, e.g., depth data of a background object). Stereo image data of an actual scene can be acquired by the cooperation of the three units.

Of course, the planar image acquisition device and the depth information measuring device in the signal source include but not limited to the above examples. In addition, the signal source in the embodiment of the present disclosure is also not limited to the mode of adopting the signal source to capture and acquire different depth images, and the signal source may also acquire relevant information of different depth images through an external device.

For instance, the display device provided by any foregoing embodiment of the present disclosure may be a vehicle display device. In this case, a 3D image of a surrounding scene of a vehicle may be directly acquired by the signal source and processed to achieve 3D display with good stereo effect.

For instance, the transparent display units in the display device provided by at least one embodiment of the present disclosure may be polymer light-emitting diode (PLED) display units (for instance, PLED displays) or transparent organic light-emitting diode (OLED) display units (for instance, OLED displays). For instance, the transparent display unit may include a transparent substrate, light emitters and a diffuser. The transparent substrate is divided into a plurality of pixels; each pixel is provided with a light emitter; the light emitter is, for instance, a PLED or OLED; the occupied area of the light emitter is less than a corresponding pixel region that the light emitter irradiates; and the switchable diffuser is disposed in front of the transparent substrate. When the diffuser operates in the transparent mode, the transparent display units are basically transparent; and vice versa, when the diffuser operates in the display mode, light emitted from the light emitters is diffused and hence forms uniform pixels of the transparent display unit.

For instance, the layer-by-layer scan circuit in the display device provided by at least one embodiment of the present disclosure may be a time sequence controller. Description will be given below to the working principle of the layer-by-layer scan circuit with reference to FIG. 6.

Figure 6:
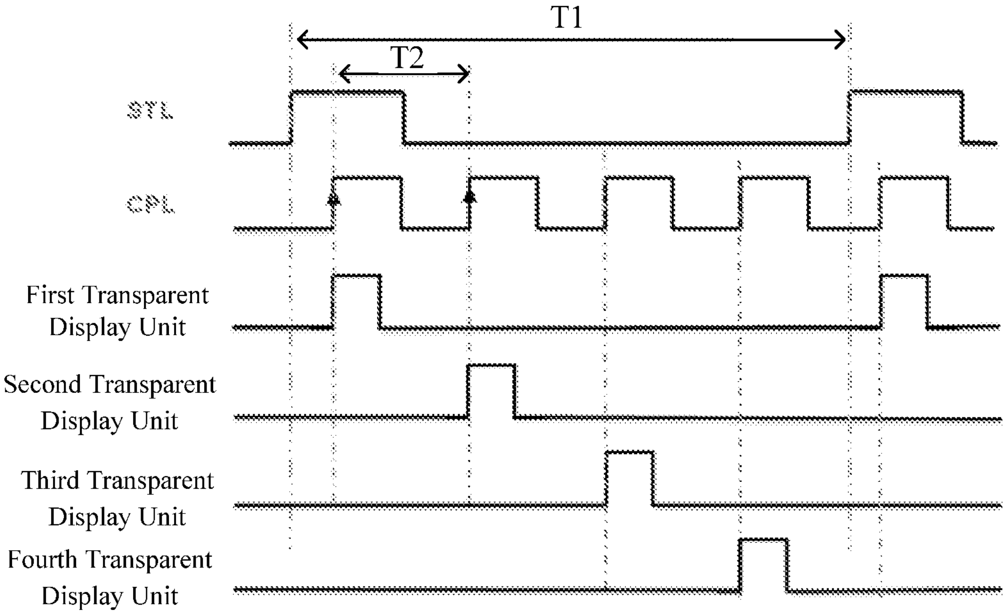
FIG. 6 is a schematic diagram illustrating driving signals of a layer-by-layer scan circuit in the display device provided by the embodiment of the present disclosure.

As illustrated in FIG. 6, the driving signals of the layer-by-layer scan circuit include: start layer (STL) signals, namely layer-by-layer scan start signals; and clock pulse layer (CPL) signals, namely layer-by-layer scan shift signals.

A rising edge of the STL signal indicates the start of layer-by-layer scan, namely indicating the start of one frame of 3D image, in which T1 represents the refresh time of one frame of 3D image, namely the time from a rising edge of the first STL signal to a rising edge of the second STL signal; taking the case that the display device provided by the embodiment of the present disclosure comprises 4 transparent display units as an example, the STL signal includes rising edges of 4 CPL signals, that is, the 4 transparent display units respectively scan and display once within the display time of one frame of 3D image; and T2 represents the scan display time of each transparent display unit.

After the start of layer-by-layer scan, the first rising edge of the CPL signal indicates that the driving voltage of the first transparent display unit is switched on and a source driver inputs display data. At this point, only the first transparent display unit displays the image, and other transparent display units are switched off and are in transparent state.

The second rising edge of the CPL signal indicates that the driving voltage of the second transparent display unit is switched on and a source driver inputs display data. At this point, only the second transparent display unit displays the image, and other transparent display units are switched off and are in transparent state.

The modes of the layer-by-layer scan circuit in scanning the third and fourth transparent display units may refer to the mode of scanning the first and second transparent display units. By setting of the frequency of the STL signal to be greater than or equal to 24 Hz, the images displayed by the transparent display units viewed by the viewer can be synthesized into a continuous 3D image, so as to achieve true stereo image effect.

At least one embodiment of the present disclosure further provides a display method, which comprises: respectively inputting a plurality of depth images based on the same 3D image into a plurality of transparent display units, in which the plurality of depth images have different depth ranges, and the plurality of transparent display units emit imaging light along the same direction and are arranged in sequence with spaces therebetween along the same direction; and controlling the plurality of transparent display units to display the inputted depth images in sequence, and when each transparent display unit displays the inputted depth image, controlling transparent display units on a display side of the each transparent display unit to be in transparent state, for instance, controlling all the remaining transparent display units to be in transparent state. For instance, as for a first transparent display unit 31, as there is no other transparent display unit on a display side of the transparent display unit, the step of controlling the transparent display units on the display side of each transparent display unit to be in transparent state is not required to be executed. However, the embodiment of the present disclosure is not limited thereto. Other transparent display units on an opposite side of the display side of the transparent display unit may also be controlled to be in a transparent state.

For instance, the steps of the display method may be executed by the signal source, the layer-by-layer scan circuit and the plurality of transparent display units in the display device provided by any foregoing embodiment.

For instance, the display method may further comprise: dividing a 3D image into a plurality of depth images. For instance, in the method, at least partial depth range of the 3D image may be divided into different depth ranges to acquire the plurality of depth images. For instance, the plurality of depth images may be acquired through a depth processing device in the signal source of the display device provided by any foregoing embodiment.

For instance, the number of the plurality of depth images divided from the 3D image may be equal to the number of the plurality of transparent display units.

For instance, the plurality of transparent display units are sequentially arranged along a direction opposite to the propagation direction of imaging light, and the maximum depth of the respectively displayed depth images may be gradually increased. That is to say, when the distance from objects in the depth image to a camera in the shooting process is smaller, the depth image is displayed by the transparent display unit closer to the viewer in the case of 3D display, so that the viewer can produce a real sense of hierarchy through the real physical distance of the plurality of transparent display units. It should be noted that the maximum depth refers to an upper limit of the depth range of the depth image.

For instance, the plurality of transparent display units may have the serial number of 1, 2, 3, . . . , n in sequence along the direction opposite to the propagation direction of the imaging light (namely in the case of 3D display, the distance from the transparent display units 1, 2, 3, . . . , n to the viewer is gradually increased), and the distance from the transparent display units 2, 3, . . . , n to the transparent display unit 1 is respectively d21, d31, . . . , dn1; the 3D image is divided into the plurality of depth images by a plurality of thresholds; and the plurality of thresholds are respectively k·d21, k·d31, . . . , k·dn1, in which k is a coefficient greater than 0. For instance, n≥3. For instance, when n=4, the division of the depth ranges of the depth images may refer to relevant description in the embodiment of the present disclosure, so no further description will be given here. Of course, when transparent display units of other numbers are adopted, the similar mode of dividing different depth ranges of the depth images according to the number of the transparent display units and different distances between the transparent display units may also be adopted.

For instance, in the display method, the refresh rate of each transparent display unit may be greater than or equal to 24 frames per second. Thus, in the case of 3D display, by utilization of the persistence of vision of the human eyes, the images displayed by the transparent display units viewed by the viewer can be synthesized into a continuous 3D image.

The settings of the structures in the display method may refer to the embodiments of the display device. No further description will be given here.

The display device and the display method, provided by the embodiment of the present disclosure, have the following advantages. Description will be given below one by one.

In the display device and the display method, provided by the embodiment of the present disclosure, the depth processing device in the signal source divides the 3D image into a plurality of depth images with different depth ranges (for instance, an FG image, a CS image, an MS image and an LS image); the depth images are respectively inputted into the plurality of transparent display units; when the distance from an object in the depth image to the camera in the shooting process is smaller, the transparent display unit for displaying the object is closer to the viewer, so that the viewer can produce a real sense of hierarchy according to the real physical distance of the plurality of transparent display units, and hence a more real 3D image can be formed in the brain. Compared with the technology of achieving 3D display by adoption of stereo image pairs, as the parallax barrier is not required to be used in the embodiment of the present disclosure, the embodiment of the present disclosure can reduce the power consumption of 3D display.

The 3D display technology by adoption of stereo image pair technology must acquire images viewed by the left eye and the right eye by means of image separation, and form a virtual 3D image in the brain by utilization of binocular parallax. The viewer will have a sense of vertigo when viewing a display adopting the 3D display technology for a long time, so the 3D display technology by adoption of the stereo image pairs is not conducive to the health of the viewer. However, the 3D display technology in the embodiment of the present disclosure can form a 3D image with true feeling of depth without the requirement of separating the image for the viewing of the left eye and the right eye, and hence can avoid the visual fatigue caused by the 3D imaging mode by adoption of the stereo image pair technology to the human eyes, and is a brand-new healthy 3D display technology.

In glasses type 3D display technology, the viewer feels uncomfortable due to the wearing of 3D glasses. The 3D display technology provided by the embodiment of the present disclosure is glasses-free 3D display technology, and hence is a development trend in the future 3D display technology.

The embodiment of the present disclosure provides a 3D display technology based on transparent displays (for instance, transparent OLED or PLED displays), which achieves the stereo image effect with more real depth by the combination of a plurality of layers of images, and lays the foundation for the popularization of the transparent displays to the technical field of 3D display.

It should be noted that the embodiments of the present disclosure and the characteristics in the embodiments may be mutually combed without conflict.

The foregoing is merely exemplary embodiments of the invention, but is not used to limit the protection scope of the invention. The protection scope of the invention shall be defined by the attached claims.

The application claims priority to the Chinese patent application No. 201610262702.6, filed Apr. 25, 2016 the entire disclosure of which is incorporated herein by reference as part of the present application.

The invention claimed is:

1. A display device, comprising:

a plurality of transparent display units configured to emit imaging light along a same direction and arranged in sequence with spaces therebetween along a light-emitting direction of the imaging light;

a layer-by-layer scan circuit configured to respectively input a plurality of depth images of a same three-dimensional (3D) image into corresponding transparent display units in the plurality of transparent display units, wherein, the plurality of depth images have different depth ranges; and upon each transparent display unit displaying the inputted depth image, the layer-by-layer scan circuit is configured to control the remaining transparent display units to be in a transparent state without displaying image, so that the each transparent display unit can display all the pixels in the inputted depth image; and a signal source configured to provide the plurality of depth images, wherein the signal source includes a depth processing device configured to process the 3D image to acquire the plurality of depth images, wherein the depth processing device is configured so that the plurality of transparent display units have a serial number of 1, 2, 3, . . . , n in sequence along the direction opposite to the propagation direction of the imaging light; distances from the transparent display units 2, 3, . . . , n to the transparent display unit 1 is respectively d21, d31 . . . , dn1; the depth image for the transparent display unit with the serial number of 1 has an image depth less than k·d21, the depth image for the transparent display unit with the serial number of 2 has an image depth in a range from k·d21 to k·d31, . . . , the depth image for the transparent display unit with the serial number of n has an image depth larger than k·dn1, in which k is a coefficient greater than 0, and an overall scaling of the 3D image is performed by adjusting a value of k.

2. The display device according to claim 1, wherein as a maximum depth of the plurality of depth images is sequentially increased, a distance from the transparent display units respectively corresponding to the plurality of depth images to a display surface of the display device is sequentially increased.

3. The display device according to claim 1, wherein a number of the plurality of depth images is equal to a number of the plurality of transparent display units.

4. The display device according to claim 1, wherein the depth processing device includes a processor, a memory and computer program instructions stored into the memory; and the computer program instructions are run by the processor so as to execute the following action: dividing at least partial depth range of the 3D image into the different depth ranges so as to acquire the plurality of depth images.

5. The display device according to claim 1, wherein display regions of the plurality of transparent display units have a same size.

6. The display device according to claim 5, wherein a distance between adjacent transparent display units is not greater than a ratio of a maximum size of the display region to a number of the transparent display units.

7. The display device according to claim 1, wherein distances between adjacent transparent display units in the plurality of transparent display units are equal.

8. The display device according to claim 1, wherein the plurality of transparent display units are all transparent organic light-emitting diode (OLED) display units or transparent polymer light-emitting diode (PLED) display units.

9. The display device according to claim 1, wherein the signal source includes a 3D image acquisition device which is configured to acquire light intensity of objects in a target scene and a distance from the objects to the 3D image acquisition device.

10. The display device according to claim 9, wherein the 3D image acquisition device includes a planar image acquisition device and a depth information measuring device.

11. The display device according to claim 1, wherein the display device is a vehicle display device.

12. A display method, comprising:

respectively inputting a plurality of depth images based on a same 3D image into a plurality of transparent display units, wherein the plurality of depth images have different depth ranges, and the plurality of transparent display units emit imaging light along a same direction and are arranged in sequence with spaces therebetween along the same direction; and controlling the plurality of transparent display units to sequentially display the inputted depth image, and controlling the remaining transparent display units in a transparent state without displaying image upon the each transparent display unit displaying the inputted depth image, so that the each transparent display unit can display all the pixels in the inputted depth image, wherein the plurality of transparent display units are sequentially arranged along a direction opposite to a propagation direction of the imaging light and are configured to display the respective depth images with gradually increased maximum depths, wherein the plurality of transparent display units have a serial number of 1, 2, 3, . . . , n in sequence along the direction opposite to the propagation direction of the imaging light; distances from the transparent display units 2, 3, . . . , n to the transparent display unit 1 is respectively d21, d31 . . . , dn1; the depth image for the transparent display unit with the serial number of 1 has an image depth less than k·d21, the depth image for the transparent display unit with the serial number of 2 has an image depth in a range from k·d21 to k·d31, . . . , the depth image for the transparent display unit with the serial number of n has an image depth larger than k·dn1, in which k is a coefficient greater than 0, an overall scaling of the 3D image is performed by adjusting a value of k.

13. The display method according to claim 12, wherein at least partial depth range of the 3D image is divided into different depth ranges to acquire the plurality of depth images.

14. The display method according to claim 12, wherein a number of the plurality of depth images is equal to a number of the plurality of transparent display units.

15. The display method according to claim 12, wherein a refresh rate of each transparent display unit is greater than or equal to 24 frames per second.

16. A display device, comprising:

a plurality of transparent display units configured to emit imaging light along a same direction and arranged in sequence with spaces therebetween along a light-emitting direction of the imaging light; and a layer-by-layer scan circuit configured to respectively input a plurality of depth images of a same three-dimensional (3D) image into corresponding transparent display units in the plurality of transparent display units, wherein, the plurality of depth images have different depth ranges; and upon each transparent display unit displaying the inputted depth image, the layer-by-layer scan circuit is configured to control the transparent display units on a display side of the each transparent display unit to be in a transparent state without displaying image, so that the each transparent display unit can display all the pixels in the inputted depth image; and a signal source configured to provide the plurality of depth images, wherein the signal source includes a depth processing device configured to process the 3D image to acquire the plurality of depth images, wherein the depth processing device is configured so that the plurality of transparent display units have a serial number of 1, 2, 3, . . . , n in sequence along the direction opposite to the propagation direction of the imaging light: distances from the transparent display units 2, 3, . . . , n to the transparent display unit 1 is respectively d21, d31 . . . , dn1; the depth image for the transparent display unit with the serial number of 1 has an image depth less than k·d21, the depth image for the transparent display unit with the serial number of 2 has an image depth in a range from k·d21 to k·d31, . . . , the depth image for the transparent display unit with the serial number of n has an image depth larger than k·dn1, in which k is a coefficient greater than 0, and an overall scaling of the 3D image is performed by adjusting a value of k.

* * * * *